United States Patent
Versteyhe et al.

(10) Patent No.: US 9,638,296 B2
(45) Date of Patent: May 2, 2017

(54) BALL TYPE CVT INCLUDING A DIRECT DRIVE MODE

(71) Applicant: Dana Limited, Maumee, OH (US)

(72) Inventors: Mark R. J. Versteyhe, Oostkamp (BE); Thibaut E. Duchene, Woluwe-Saint-Lambert (BE)

(73) Assignee: Dana Limited, Maumee, OH (US)

( * ) Notice: Subject to any disclaimer, the term of this patent is extended or adjusted under 35 U.S.C. 154(b) by 270 days.

(21) Appl. No.: 14/425,601

(22) PCT Filed: Sep. 5, 2013

(86) PCT No.: PCT/US2013/058309
§ 371 (c)(1),
(2) Date: Mar. 3, 2015

(87) PCT Pub. No.: WO2014/039708
PCT Pub. Date: Mar. 13, 2014

(65) Prior Publication Data
US 2015/0354676 A1 Dec. 10, 2015

Related U.S. Application Data

(60) Provisional application No. 61/697,925, filed on Sep. 7, 2012, provisional application No. 61/780,456, filed on Mar. 13, 2013.

(51) Int. Cl.
*F16H 15/50* (2006.01)
*F16H 37/02* (2006.01)
*F16H 15/28* (2006.01)

(52) U.S. Cl.
CPC ......... *F16H 15/503* (2013.01); *F16H 37/021* (2013.01); *F16H 15/28* (2013.01); *F16H 2037/023* (2013.01)

(58) Field of Classification Search
None
See application file for complete search history.

(56) References Cited

U.S. PATENT DOCUMENTS

| 1,063,244 A | 6/1913 | Ludwig |
| 1,215,969 A | 2/1917 | Thomas |

(Continued)

FOREIGN PATENT DOCUMENTS

| AU | 2011224083 A1 | 10/2011 |
| CN | 101392825 A | 3/2009 |

(Continued)

OTHER PUBLICATIONS

Co-pending U.S. Appl. No. 14/925,813, filed Oct. 28, 2015.

(Continued)

*Primary Examiner* — Edwin A Young
(74) *Attorney, Agent, or Firm* — Marshall & Melhorn, LLC

(57) ABSTRACT

Variable transmissions and drivelines using such transmissions having a direct drive mode, a reverse mode, and a continuously variable mode of operation using a continuously variable variator in combination with a gearbox having a one or two speed forward gear, a reverse gear, and a direct drive clutch. The direct drive clutch transfers power from the input shaft directly to the gearbox by running the variator in a unitary (1) speed ratio configuration, or by bypassing the variator altogether by using a set of clutches that disconnect the variator from the input shaft. Additional gears may be provided in the gearbox.

20 Claims, 5 Drawing Sheets

(56) References Cited

U.S. PATENT DOCUMENTS

| | | |
|---|---|---|
| 1,526,140 A | 2/1925 | Gruver |
| 2,019,006 A | 10/1935 | Ferrarl |
| 2,060,884 A | 11/1936 | Madle |
| 2,148,759 A | 2/1939 | Grand |
| 2,405,201 A | 8/1946 | Franck |
| 2,660,897 A | 12/1953 | Neidhart et al. |
| 2,729,118 A | 1/1956 | Emslie |
| 2,931,235 A | 4/1960 | Hayward |
| 3,203,278 A | 8/1965 | General |
| 3,376,633 A | 4/1968 | Wesley |
| 3,407,687 A | 10/1968 | Hayashi |
| 3,470,720 A | 10/1969 | Phillip et al. |
| 3,505,718 A | 4/1970 | Carl |
| 3,583,060 A | 6/1971 | Maurice |
| 3,688,600 A | 9/1972 | Allan |
| 3,765,270 A | 10/1973 | Lemieux |
| 3,774,280 A | 11/1973 | Eklund et al. |
| 3,831,245 A | 8/1974 | Amos |
| 3,894,559 A | 7/1975 | DePuy |
| 4,046,988 A | 9/1977 | Okuda et al. |
| 4,187,709 A | 2/1980 | Legate et al. |
| 4,226,140 A | 10/1980 | Gaasenbeek |
| 4,333,358 A | 6/1982 | Grattapaglia |
| 4,344,336 A | 8/1982 | Carriere |
| 4,360,090 A | 11/1982 | Wonn |
| 4,368,572 A | 1/1983 | Kanazawa et al. |
| 4,464,952 A | 8/1984 | Stubbs |
| 4,693,134 A | 9/1987 | Kraus |
| 4,731,044 A | 3/1988 | Mott |
| 4,756,211 A | 7/1988 | Fellows |
| 4,784,017 A | 11/1988 | Johnshoy |
| 4,856,371 A | 8/1989 | Kemper |
| 4,856,374 A | 8/1989 | Kreuzer |
| 4,950,208 A | 8/1990 | Tomlinson |
| 4,963,122 A | 10/1990 | Ryan |
| 4,963,124 A | 10/1990 | Takahashi et al. |
| 5,109,962 A | 5/1992 | Sato |
| 5,168,778 A | 12/1992 | Todd et al. |
| 5,217,412 A | 6/1993 | Indlekofer et al. |
| 5,230,670 A | 7/1993 | Hibi |
| 5,238,460 A | 8/1993 | Esaki et al. |
| 5,318,486 A | 6/1994 | Lutz |
| 5,390,759 A | 2/1995 | Gollner |
| 5,401,221 A | 3/1995 | Fellows et al. |
| 5,520,588 A | 5/1996 | Hall, III |
| 5,527,231 A | 6/1996 | Seidel et al. |
| 5,577,423 A | 11/1996 | Mimura |
| 5,599,251 A | 2/1997 | Beim et al. |
| 5,659,956 A | 8/1997 | Braginsky et al. |
| 5,683,322 A | 11/1997 | Meyerle |
| 5,726,353 A | 3/1998 | Matsuda et al. |
| 5,730,678 A | 3/1998 | Larkin |
| 5,766,105 A | 6/1998 | Fellows et al. |
| 5,776,028 A | 7/1998 | Matsuda et al. |
| 5,800,303 A | 9/1998 | Benford |
| 5,860,888 A | 1/1999 | Lee |
| 5,915,801 A | 6/1999 | Taga et al. |
| 5,961,415 A | 10/1999 | Justice et al. |
| 5,971,883 A | 10/1999 | Klemen |
| 5,996,226 A | 12/1999 | Gibbs |
| 6,009,365 A | 12/1999 | Takahara et al. |
| 6,036,616 A | 3/2000 | McCarrick et al. |
| 6,045,477 A | 4/2000 | Schmidt |
| 6,053,839 A | 4/2000 | Baldwin et al. |
| 6,059,685 A | 5/2000 | Hoge et al. |
| 6,071,208 A | 6/2000 | Koivunen |
| 6,080,080 A | 6/2000 | Bolz et al. |
| 6,083,135 A | 7/2000 | Baldwin et al. |
| 6,086,504 A | 7/2000 | Illerhaus |
| 6,089,287 A | 7/2000 | Welsh et al. |
| 6,095,942 A | 8/2000 | Yamaguchi et al. |
| 6,155,951 A | 12/2000 | Kuhn et al. |
| 6,217,474 B1 | 4/2001 | Ross et al. |
| 6,251,038 B1 | 6/2001 | Ishikawa et al. |
| 6,273,838 B1 | 8/2001 | Park |
| 6,342,026 B1 | 1/2002 | Takagi et al. |
| 6,358,178 B1 | 3/2002 | Wittkopp |
| 6,371,880 B1 | 4/2002 | Kam |
| 6,481,258 B1 | 11/2002 | Belinky |
| 6,554,735 B2 | 4/2003 | Kanazawa |
| 6,558,285 B1 | 5/2003 | Sieber |
| 6,585,619 B2 | 7/2003 | Henzler |
| 6,609,994 B2 | 8/2003 | Muramoto |
| 6,632,157 B1 | 10/2003 | Gierling et al. |
| 6,641,497 B2 | 11/2003 | Deschamps et al. |
| 6,645,106 B2 | 11/2003 | Goo et al. |
| 6,689,012 B2 | 2/2004 | Miller et al. |
| 6,705,964 B2 | 3/2004 | Nagai et al. |
| 6,719,659 B2 | 4/2004 | Geiberger et al. |
| 6,723,016 B2 | 4/2004 | Sumi |
| 6,726,590 B2 | 4/2004 | Henzler et al. |
| 6,733,412 B2 | 5/2004 | Kumagai et al. |
| 6,752,696 B2 | 6/2004 | Murai et al. |
| 6,793,603 B2 | 9/2004 | Teraoka et al. |
| 6,849,020 B2 | 2/2005 | Sumi |
| 6,866,606 B2 | 3/2005 | Ooyama |
| 6,949,045 B2 | 9/2005 | Wafzig et al. |
| 6,979,275 B2 | 12/2005 | Hiraku et al. |
| 6,986,725 B2 | 1/2006 | Morscheck |
| 7,033,298 B2 | 4/2006 | Usoro et al. |
| 7,074,154 B2 | 7/2006 | Miller |
| 7,086,981 B2 | 8/2006 | Ali et al. |
| 7,104,917 B2 | 9/2006 | Klemen et al. |
| 7,128,681 B2 | 10/2006 | Sugino et al. |
| 7,160,220 B2 | 1/2007 | Shinojima et al. |
| 7,186,199 B1 | 3/2007 | Baxter, Jr. |
| 7,217,214 B2 | 5/2007 | Morscheck et al. |
| 7,234,543 B2 | 6/2007 | Schaaf |
| 7,288,044 B2 | 10/2007 | Gumpoltsberger |
| 7,311,634 B2 | 12/2007 | Shim et al. |
| 7,335,126 B2 | 2/2008 | Tsuchiya et al. |
| 7,347,801 B2 | 3/2008 | Guenter et al. |
| 7,396,309 B2 | 7/2008 | Heitz et al. |
| 7,431,677 B2 | 10/2008 | Miller et al. |
| 7,470,210 B2 | 12/2008 | Miller et al. |
| 7,473,202 B2 | 1/2009 | Morscheck et al. |
| 7,485,069 B2 | 2/2009 | Jang et al. |
| 7,497,798 B2 | 3/2009 | Kim |
| 7,588,514 B2 | 9/2009 | McKenzie et al. |
| 7,637,838 B2 | 12/2009 | Gumpoltsberger |
| 7,672,770 B2 | 3/2010 | Inoue et al. |
| 7,686,729 B2 | 3/2010 | Miller et al. |
| 7,717,815 B2 | 5/2010 | Tenberge |
| 7,727,107 B2 | 6/2010 | Miller |
| 7,780,566 B2 | 8/2010 | Seo |
| 7,874,153 B2 | 1/2011 | Behm |
| 7,878,935 B2 | 2/2011 | Lahr |
| 7,951,035 B2 | 5/2011 | Platt |
| 7,980,972 B1 | 7/2011 | Starkey et al. |
| 8,029,401 B2 | 10/2011 | Johnson |
| 8,052,569 B2 | 11/2011 | Tabata et al. |
| 8,062,175 B2 | 11/2011 | Krueger et al. |
| 8,066,614 B2 | 11/2011 | Miller et al. |
| 8,142,323 B2 | 3/2012 | Tsuchiya et al. |
| 8,226,518 B2 | 7/2012 | Parraga |
| 8,257,216 B2 | 9/2012 | Hoffman |
| 8,257,217 B2 | 9/2012 | Hoffman |
| 8,287,414 B2 | 10/2012 | Weber et al. |
| 8,313,404 B2 | 11/2012 | Carter et al. |
| 8,376,903 B2 | 2/2013 | Pohl et al. |
| 8,382,636 B2 | 2/2013 | Shiina et al. |
| 8,447,480 B2 | 5/2013 | Usukura |
| 8,469,856 B2 | 6/2013 | Thomassy |
| 8,545,368 B1 | 10/2013 | Davis et al. |
| 8,594,867 B2 | 11/2013 | Heap et al. |
| 8,622,871 B2 | 1/2014 | Hoff |
| 8,639,419 B2 | 1/2014 | Roli et al. |
| 8,668,614 B2 | 3/2014 | Sherrill et al. |
| 8,678,975 B2 | 3/2014 | Koike |
| 8,870,711 B2 | 10/2014 | Pohl et al. |
| 8,888,643 B2 | 11/2014 | Lohr et al. |
| 8,926,468 B2 | 1/2015 | Versteyhe et al. |
| 8,986,150 B2 | 3/2015 | Versteyhe et al. |
| 9,114,799 B2 | 8/2015 | Tsukamoto et al. |

(56) References Cited

U.S. PATENT DOCUMENTS

| | | |
|---|---|---|
| 9,156,463 B2 | 10/2015 | Legner et al. |
| 2002/0004438 A1 | 1/2002 | Toukura et al. |
| 2002/0094911 A1 | 7/2002 | Haka |
| 2002/0169048 A1 | 11/2002 | Henzler et al. |
| 2003/0060318 A1 | 3/2003 | Sumi |
| 2003/0181280 A1 | 9/2003 | Elser et al. |
| 2003/0200783 A1 | 10/2003 | Shai |
| 2003/0213125 A1 | 11/2003 | Chiuchang |
| 2003/0216121 A1 | 11/2003 | Yarkosky |
| 2003/0228952 A1 | 12/2003 | Joe et al. |
| 2004/0058769 A1 | 3/2004 | Larkin |
| 2004/0061639 A1 | 4/2004 | Voigtlaender et al. |
| 2004/0166984 A1 | 8/2004 | Inoue |
| 2004/0167391 A1 | 8/2004 | Solar et al. |
| 2004/0171452 A1 | 9/2004 | Miller et al. |
| 2005/0102082 A1 | 5/2005 | Joe et al. |
| 2005/0137046 A1 | 6/2005 | Miller et al. |
| 2005/0153810 A1 | 7/2005 | Miller et al. |
| 2006/0094515 A1 | 5/2006 | Szuba et al. |
| 2006/0234822 A1 | 10/2006 | Morscheck et al. |
| 2006/0276294 A1 | 12/2006 | Coffey et al. |
| 2007/0021259 A1 | 1/2007 | Tenberge |
| 2007/0032327 A1 | 2/2007 | Raghavan et al. |
| 2007/0042856 A1 | 2/2007 | Greenwood |
| 2007/0072732 A1 | 3/2007 | Klemen |
| 2007/0096556 A1 | 5/2007 | Kokubo et al. |
| 2007/0270270 A1 | 11/2007 | Miller et al. |
| 2007/0275808 A1 | 11/2007 | Iwanaka et al. |
| 2008/0039273 A1 | 2/2008 | Smithson et al. |
| 2008/0103002 A1 | 5/2008 | Holmes |
| 2008/0121487 A1 | 5/2008 | Miller et al. |
| 2008/0185201 A1 | 8/2008 | Bishop |
| 2009/0017959 A1 | 1/2009 | Triller |
| 2009/0048054 A1 | 2/2009 | Tsuchiya et al. |
| 2009/0062064 A1 | 3/2009 | Kamada et al. |
| 2009/0132135 A1 | 5/2009 | Quinn, Jr. et al. |
| 2009/0221391 A1 | 9/2009 | Bazyn et al. |
| 2009/0221393 A1 | 9/2009 | Kassler |
| 2009/0280949 A1* | 11/2009 | Lohr .................... F16H 15/52 476/11 |
| 2009/0286651 A1 | 11/2009 | Tanaka et al. |
| 2009/0312137 A1 | 12/2009 | Rohs et al. |
| 2010/0056322 A1 | 3/2010 | Thomassy |
| 2010/0093476 A1 | 4/2010 | Carter et al. |
| 2010/0093479 A1 | 4/2010 | Carter et al. |
| 2010/0106386 A1 | 4/2010 | Krasznai et al. |
| 2010/0113211 A1 | 5/2010 | Schneider et al. |
| 2010/0137094 A1 | 6/2010 | Pohl |
| 2010/0141193 A1 | 6/2010 | Rotondo et al. |
| 2010/0173743 A1* | 7/2010 | Nichols ................ F16H 15/52 476/38 |
| 2010/0244755 A1 | 9/2010 | Kinugasa et al. |
| 2010/0267510 A1 | 10/2010 | Nichols et al. |
| 2010/0282020 A1 | 11/2010 | Greenwood et al. |
| 2010/0304915 A1 | 12/2010 | Lahr |
| 2010/0310815 A1 | 12/2010 | Mendonca et al. |
| 2011/0015021 A1 | 1/2011 | Maguire et al. |
| 2011/0034284 A1 | 2/2011 | Pohl et al. |
| 2011/0152031 A1 | 6/2011 | Schoolcraft |
| 2011/0165982 A1 | 7/2011 | Hoffman et al. |
| 2011/0165985 A1 | 7/2011 | Hoffman et al. |
| 2011/0165986 A1 | 7/2011 | Hoffman et al. |
| 2011/0230297 A1 | 9/2011 | Shiina et al. |
| 2011/0300954 A1 | 12/2011 | Szuba et al. |
| 2011/0319222 A1 | 12/2011 | Ogawa et al. |
| 2012/0024991 A1 | 2/2012 | Pilch et al. |
| 2012/0035016 A1 | 2/2012 | Miller et al. |
| 2012/0040794 A1 | 2/2012 | Schoolcraft |
| 2012/0122624 A1 | 5/2012 | Hawkins, Jr. et al. |
| 2012/0142477 A1 | 6/2012 | Winter |
| 2012/0165154 A1 | 6/2012 | Wittkopp et al. |
| 2012/0231925 A1 | 9/2012 | Shiina et al. |
| 2012/0244990 A1 | 9/2012 | Ogawa et al. |
| 2012/0309579 A1 | 12/2012 | Miller et al. |
| 2013/0130859 A1 | 5/2013 | Lundberg et al. |
| 2013/0133965 A1 | 5/2013 | Books |
| 2013/0184115 A1 | 7/2013 | Urabe et al. |
| 2013/0190131 A1 | 7/2013 | Versteyhe et al. |
| 2013/0226416 A1 | 8/2013 | Seipold et al. |
| 2013/0303325 A1 | 11/2013 | Carey et al. |
| 2013/0304344 A1 | 11/2013 | Abe |
| 2013/0338888 A1 | 12/2013 | Long et al. |
| 2014/0194242 A1 | 7/2014 | Cooper |
| 2014/0194243 A1 | 7/2014 | Versteyhe et al. |
| 2014/0223901 A1 | 8/2014 | Versteyhe et al. |
| 2014/0274536 A1 | 9/2014 | Versteyhe et al. |
| 2014/0274540 A1 | 9/2014 | Schoolcraft |
| 2014/0274552 A1 | 9/2014 | Frink et al. |
| 2014/0329637 A1 | 11/2014 | Thomassy et al. |
| 2015/0024899 A1 | 1/2015 | Phillips |
| 2015/0051801 A1 | 2/2015 | Quinn, Jr. et al. |
| 2015/0204429 A1 | 7/2015 | Versteyhe et al. |
| 2015/0204430 A1 | 7/2015 | Versteyhe et al. |
| 2015/0226294 A1 | 8/2015 | Ziech et al. |
| 2015/0226298 A1 | 8/2015 | Versteyhe et al. |
| 2015/0226299 A1 | 8/2015 | Cooper et al. |
| 2015/0252881 A1 | 9/2015 | Versteyhe |
| 2016/0033021 A1 | 2/2016 | Cooper et al. |
| 2016/0047448 A1 | 2/2016 | Versteyhe et al. |
| 2016/0109001 A1 | 4/2016 | Schoolcraft |
| 2016/0123438 A1 | 5/2016 | Ziech et al. |
| 2016/0131235 A1 | 5/2016 | Phillips |
| 2016/0185353 A1 | 6/2016 | Honma et al. |
| 2016/0281828 A1 | 9/2016 | Haka |
| 2016/0290458 A1 | 10/2016 | Taskiran et al. |

FOREIGN PATENT DOCUMENTS

| | | |
|---|---|---|
| CN | 101617146 A | 12/2009 |
| CN | 202165536 U | 3/2012 |
| DE | 1237380 B | 3/1967 |
| DE | 3245045 A1 | 6/1984 |
| DE | 102005010751 A1 | 9/2006 |
| EP | 0156936 A1 | 10/1985 |
| EP | 0210053 A2 | 1/1987 |
| EP | 1061288 A2 | 12/2000 |
| EP | 2113056 B1 | 7/2012 |
| FR | 796188 A | 3/1936 |
| FR | 1030702 A | 6/1953 |
| FR | 1472282 A | 3/1967 |
| FR | 2185076 A5 | 12/1973 |
| FR | 2280451 A1 | 2/1976 |
| FR | 2918433 A1 | 1/2009 |
| GB | 1127825 A | 9/1968 |
| GB | 2196892 A | 5/1988 |
| GB | 2248895 A | 4/1992 |
| JP | H09119506 A | 5/1997 |
| JP | 2008180214 A | 8/2008 |
| JP | 2009058085 A | 3/2009 |
| JP | 2011153583 A | 8/2011 |
| WO | WO-2006002457 A1 | 1/2006 |
| WO | WO-2006041718 A2 | 4/2006 |
| WO | WO-2007046722 A1 | 4/2007 |
| WO | WO-2007051827 A1 | 5/2007 |
| WO | WO-2008103543 A1 | 8/2008 |
| WO | WO-2011011991 A2 | 2/2011 |
| WO | WO-2012008884 A1 | 1/2012 |
| WO | WO-2012177187 A1 | 12/2012 |
| WO | WO-2013109723 A1 | 7/2013 |
| WO | WO-2013123117 A1 | 8/2013 |
| WO | WO-2014039438 A2 | 3/2014 |
| WO | WO-2014039439 A1 | 3/2014 |
| WO | WO-2014039440 A1 | 3/2014 |
| WO | WO-2014039447 A1 | 3/2014 |
| WO | WO-2014039448 A2 | 3/2014 |
| WO | WO-2014039708 A1 | 3/2014 |
| WO | WO-2014039713 A1 | 3/2014 |
| WO | WO-2014039846 A2 | 3/2014 |
| WO | WO-2014039900 A1 | 3/2014 |
| WO | WO-2014039901 A1 | 3/2014 |
| WO | WO-2014078583 A1 | 5/2014 |
| WO | WO-2014124291 A1 | 8/2014 |
| WO | WO-2014151889 A2 | 9/2014 |
| WO | WO-2014159755 A2 | 10/2014 |

(56) References Cited

FOREIGN PATENT DOCUMENTS

| | | |
|---|---|---|
| WO | WO-2014159756 A2 | 10/2014 |
| WO | WO-2014165259 A1 | 10/2014 |
| WO | WO-2014179717 A1 | 11/2014 |
| WO | WO-2014179719 A1 | 11/2014 |
| WO | WO-2014186732 A1 | 11/2014 |
| WO | WO-2014197711 A1 | 12/2014 |
| WO | WO-2015059601 A1 | 4/2015 |
| WO | WO-2015073883 A1 | 5/2015 |
| WO | WO-2015073887 A1 | 5/2015 |
| WO | WO-2015073948 A2 | 5/2015 |
| WO | WO-2015195759 A2 | 12/2015 |
| WO | WO-2015200769 A1 | 12/2015 |
| WO | WO-2016094254 A1 | 6/2016 |

OTHER PUBLICATIONS

PCT/US2014/025001 International Preliminary Report on Patent ability dated Sep. 24, 2015.
PCT/US2014/025004 International Preliminary Report on Patentability dated Oct. 1, 2015.
PCT/US2014/025005 International Preliminary Report on Patentability dated Oct. 1, 2015.
PCT/US2014/026619 International Preliminary Report on Patentability dated Sep. 24, 2015.
PCT/US2014/036621 International Preliminary Report on Patentability dated Nov. 12, 2015.
PCT/US2014/036623 International Preliminary Report on Patentability dated Nov. 12, 2015.
PCT/US2014/038439 International Preliminary Report on Patentability dated Nov. 26, 2015.
PCT/US2014/065796 International Preliminary Report on Patentability dated Nov. 6, 2015.
PCT/US2014/065909 Written Opinion dated Dec. 11, 2015.
PCT/US2015/37916 International Search Report and Written Opinion dated Sep. 29, 2015.
U.S. Appl. No. 14/175,584 Office Action dated Dec. 3, 2015.
U.S. Appl. No. 14/210,130 Office Action dated Nov. 20, 2015.
U.S. Appl. No. 14/426,139 Office Action dated Oct. 6, 2015.
U.S. Appl. No. 14/542,336 Office Action dated Nov. 25, 2015.
PCT/US2014/041124 International Preliminary Report on Patentability dated Dec. 17, 2015.
PCT/US2015/36170 International Search Report and Written Opinion dated Dec. 17, 2015.
PCT/US2015/64087 International Search Report and Written Opinion dated Feb. 11, 2016.
U.S. Appl. No. 13/743,951 Office Action dated Jan. 21, 2016.
Co-pending U.S. Appl. No. 15/067,427, filed Mar. 11, 2016.
Co-pending U.S. Appl. No. 15/067,752, filed Mar. 11, 2016.
U.S. Appl. No. 14/210,130 Office Action dated Jun. 7, 2016.
U.S. Appl. No. 14/378,750 Office Action dated Apr. 8, 2016.
U.S. Appl. No. 14/425,600 Office Action dated May 16, 2016.
PCT/US2014/065792 International Preliminary Report on Patentability dated Jun. 2, 2016.
PCT/US2014/065909 Written Opinion dated Jun. 6, 2016.
PCT/US2016/027496 International Search Report and Written Opinion dated Jul. 8, 2016.
U.S. Appl. No. 14/425,598 Office Action dated Jun. 14, 2016.
U.S. Appl. No. 14/425,842 Office Action dated Jul. 1, 2016.
U.S. Appl. No. 15/067,752 Office Action dated Jun. 30, 2016.
Co-pending U.S. Appl. No. 15/209,487, filed Jul. 13, 2016.
Co-pending U.S. Appl. No. 15/215,179, filed Jul. 20, 2016.
PCT/US2016/29853 International Search Report and Written Opinion dated Aug. 8, 2016.
U.S. Appl. No. 14/334,538 Office Action dated Jul. 29, 2016.
Co-pending U.S. Appl. No. 15/260,472, filed Sep. 9, 2016.
Co-pending U.S. Appl. No. 15/265,163, filed Sep. 14, 2016.
Co-pending U.S. Appl. No. 15/265,226, filed Sep. 14, 2016.
Co-pending U.S. Appl. No. 15/272,774, filed Sep. 22, 2016.
Co-pending U.S. Appl. No. 15/284,940, filed Oct. 4, 2016.

PCT/US2016/030930 International Search Report and Written Opinion dated Sep. 23, 2016.
PCT/US2016/038064 International Search Report and Written Opinion dated Sep. 7, 2016.
U.S. Appl. No. 14/425,600 Office Action dated Sep. 23, 2016.
U.S. Appl. No. 62/158,847, filed May 8, 2015.
PCT/US2013/021890 International Preliminary Report on Patentability dated Jul. 31, 2014.
PCT/US2013/057837 International Preliminary Report on Patentability dated Mar. 19, 2015.
PCT/US2013/057839 International Preliminary Report on Patentability dated Mar. 19, 2015.
PCT/US2013/057866 International Preliminary Report on Patentability dated Mar. 19, 2015.
PCT/US2013/070177 International Preliminary Report on Patentability dated May 28, 2015.
PCT/US2014/015352 International Search Report and Written Opinion dated May 27, 2014.
U.S. Appl. No. 13/743,951 Office Action dated Aug. 19, 2015.
U.S. Appl. No. 14/175,584 Office Action dated Apr. 2, 2015.
U.S. Appl. No. 60/616,399, filed Oct. 5, 2004.
Co-pending U.S. Appl. No. 14/542,336, filed Nov. 14, 2014.
Co-pending U.S. Appl. No. 14/546,603, filed Nov. 18, 2014.
Co-pending U.S. Appl. No. 14/622,038, filed Feb. 13, 2015.
Fallbrook Technologies. 'NuVinci® Technology', Feb. 26, 2013; [retrieved on Jun. 5, 2014]. Retrieved from internet: <URL: https://web.archive.org/web/20130226233109/http://www.fallbrooktech.com/nuvinci-technology.
Moore et al. A Three Revolute Cobot Using CVTs in Parallel, Proceedings of IMECE, 1999, 6 pgs.
PCT/US2013/021890 International Search Report dated Apr. 10, 2013.
PCT/US2013/026037 International Preliminary Report on Patentability dated Aug. 28, 2014.
PCT/US2013/026037 International Search Report dated Jul. 15, 2013.
PCT/US2013/057837 International Search Report and Written Opinion dated Mar. 31, 2014.
PCT/US2013/057838 International Preliminary Report on Patentability dated Mar. 19, 2015.
PCT/US2013/057866 International Search Report dated Feb. 11, 2014.
PCT/US2013/057868 International Preliminary Report on Patentability dated Mar. 19, 2015.
PCT/US2013/058309 International Preliminary Report on Patentability dated Mar. 19, 2015.
PCT/US2013/058309 International Search Report and Written Opinion dated Feb. 11, 2014.
PCT/US2013/058318 International Preliminary Report on Patentability dated Mar. 19, 2015.
PCT/US2013/058318 International Search Report and Written Opinion dated Feb. 11, 2014.
PCT/US2013/058545 International Preliminary Report on Patentability dated Mar. 19, 2015.
PCT/US2013/058545 International Search Report and Written Opinion dated Feb. 19, 2014.
PCT/US2013/058615 International Preliminary Report on Patentability dated Mar. 19, 2015.
PCT/US2013/058616 International Preliminary Report on Patentability dated Mar. 19, 2015.
PCT/US2013/058616 International Search Report and Written Opinion dated Feb. 11, 2014.
PCT/US2013/070177 International Search Report and Written Opinion dated Apr. 14, 2014.
PCT/US2013/57838 International Search Report and Written Opinion dated Jan. 17, 2014.
PCT/US2013/57839 International Search Report and Written Opinion dated Feb. 6, 2014.
PCT/US2013/57868 International Search Report and Written Opinion dated Apr. 9, 2014.
PCT/US2013/58615 International Search Report and Written Opinion dated Feb. 11, 2014.

(56) References Cited

OTHER PUBLICATIONS

PCT/US2014/036621 International Search Report and Written Opinion dated Sep. 4, 2014.
PCT/US2014/036623 International Search Report and Written Opinion dated Sep. 4, 2014.
PCT/US2014/038439 International Search Report and Written Opinion dated Sep. 30, 2014.
PCT/US2014/041124 International Search Report and Written Opinion dated Oct. 15, 2014.
PCT/US2014/065909 International Search Report and Written Opinion dated Feb. 19, 2015.
PCT/US2014/25001 International Search Report and Written Opinion dated Jul. 14, 2014.
PCT/US2014/25004 International Search Report and Written Opinion dated Jul. 14, 2014.
PCT/US2014/25005 International Search Report and Written Opinion dated Jul. 14, 2014.
PCT/US2014/26619 International Search Report and Written Opinion dated Sep. 9, 2014.
PCT/US2014/65792 International Search Report and Written Opinion dated Apr. 9, 2015.
PCT/US2014/65796 International Search Report and Written Opinion dated Apr. 9, 2015.
U.S. Appl. No. 13/743,951 Office Action dated Mar. 18, 2015.
U.S. Appl. No. 61/819,414, filed May 3, 2013.
U.S. Appl. No. 14/017,054 Office Action dated Aug. 27, 2014.
U.S. Appl. No. 14/017,054 Office Action dated Dec. 12, 2014.
Wong. The Temple of VTEC Asia Special Focus on the Multimatic Transmission. Temple of VTEC Asia. 2000.

* cited by examiner

BALL TYPE CVT INCLUDING A DIRECT DRIVE MODE

CROSS-REFERENCE

This application is filed pursuant to 35 U.S.C. §371 as a United States National Phase Application of International Application No. PCT/US2013/058309, filed Sep. 5, 2013, which application claims the benefit of U.S. Provisional Application No. 61/697,925, filed Sep. 7, 2012, and U.S. Provisional Application No. 61/780,456, filed Mar. 13, 2013, which are incorporated herein by reference in their entirety.

BACKGROUND OF THE INVENTION

A vehicle having a driveline including a continuously variable transmission allows an operator of the vehicle or a control system of the vehicle to vary a drive ratio in a stepless manner, permitting a power source of the vehicle to operate at its most efficient rotational speed.

SUMMARY OF THE INVENTION

Provided herein are variable transmissions having a direct drive mode, a reverse mode, and a continuously variable mode of operation using a continuously variable variator in combination with a gearbox having a one or two speed forward gear, a reverse gear, and a direct drive clutch that is configured to transfer power from the input shaft directly to the gearbox by running the variator in a speed ratio of one in a first configuration, or by bypassing the variator altogether by using a set of clutches that disconnect the variator from the input shaft.

Thus, provide herein is a vehicle transmission comprising an input shaft having a first direct drive clutch first member formed thereon; an output shaft; a variator comprising a first ring assembly drivingly engaged with the input shaft, a second ring assembly drivingly engaged with the output shaft, a direct drive clutch comprising the first direct drive clutch member and a second direct drive clutch member formed on the output shaft drivingly engaged with the second ring assembly; and a gearbox drivingly engaged with the second ring assembly and with the second direct drive clutch member through the output shaft, the gearbox comprising a first gear and a reverse gear; and wherein the vehicle transmission comprises a reverse mode, a direct drive mode, and a continuously variable mode.

In some embodiments, the gearbox comprises a second gear, third gear, or more than one gear, more than two gears, more than three gears, or even more gears. The gearbox, thus allows for a forward and reverse mode of operation.

In some embodiments, the gearbox is drivingly linked to a differential of a vehicle output. In some embodiments, the gearbox is drivingly linked to a differential of a vehicle output using a countershaft. In some embodiments, the countershaft comprises first countershaft gear, a reverse countershaft gear, and a pinion gear, and wherein the pinion gear is drivingly engaged with a vehicle output through the crown gear of the differential. In some embodiments, the first countershaft gear is selectively drivingly engaged with the first gear of the gearbox.

In some embodiments, the reverse countershaft gear is selectively drivingly engaged with the reverse gear of the gearbox. In some embodiments, the reverse gear comprises a reverse gear idler between the reverse gear and the reverse countershaft gear. In some embodiments, a reverse mode is enabled when a reverse clutch is engaged with the output shaft and the first gear is disengaged from the output shaft. In some embodiments, a reverse mode is enabled when a reverse clutch is engaged with the output shaft and the first gear is disengaged from the first countershaft gear.

In some embodiments, the gearbox comprises a second gear, and the countershaft comprises a second countershaft gear. In some embodiments, the second countershaft gear is selectively drivingly engaged with the second gear of the gearbox. In some embodiments, a reverse mode is enabled when a reverse clutch is engaged with the output shaft, the first gear is disengaged from the output shaft, and the second gear is disengaged from the output shaft. In some embodiments, a reverse mode is enabled when a reverse clutch is engaged with the output shaft, the first gear is disengaged from the first countershaft gear, and the second gear is disengaged from the second countershaft gear. While the gearbox described has particular elements, one of skill in the art would recognize that any number or type of gears may be used in the gearbox, so long as the resulting gearbox results in a forward and reverse mode for the transmission. Thus, the gearbox elements noted herein is for illustration, while alternative components are contemplated herein.

In some embodiments, disengaging the direct drive clutch results in continuously variable mode operation of the vehicle transmission. In some embodiments, in continuously variable mode power is transferred through the first ring assembly, one or more balls of the carrier assembly, the second ring assembly, the gearbox and to the vehicle output. In some embodiments, the gearbox increases the overall ratio spread and provides a reverse mode using the reverse gear.

In some embodiments, wherein engaging the direct drive clutch results in direct drive mode. In some embodiments, in direct drive mode power is transferred through directly from the input shaft to the gearbox. In some embodiments, in direct drive mode the variator is free to turn. In some embodiments, in direct drive mode a speed ratio of the variator is set to 1 by keeping the ball axles horizontal.

In some embodiments, the vehicle transmission further comprises a first variator clutch on the first ring assembly and a second variator clutch on the second ring assembly. In some embodiments, disengaging the first variator clutch and the second variator clutch disconnect the first ring assembly and the second ring assembly respectively from the input shaft and the output shaft. In some embodiments, a continuously variable mode exists when the first variator clutch and second variator clutch are engaged and the direct drive clutch is disengaged. In some embodiments, a direct drive mode exists when the first variator clutch and second variator clutch are disengaged and the direct drive clutch is engaged. In some embodiments, a direct drive mode exists when the variator stands still.

Provided herein is a vehicle driveline comprising an engine, a variable transmission of any of configuration described herein or obvious to one of skill in the art upon reading the disclosure herein, and a vehicle output. In some embodiments, the vehicle output comprises a wheel differential and one or more wheels of a vehicle. In some embodiments, the vehicle output comprises a wheel differential and a drive axle. In some embodiments, the dampener is disposed between the engine and the variable transmission. In some embodiments, the dampener comprises at least one torsional spring.

In some embodiments, the vehicle driveline comprises a clutch for starting the starting function. In some embodiments the dampener is coupled with a clutch for the starting function.

Provided herein is method comprising providing a variable transmission of any of configuration described herein or obvious to one of skill in the art upon reading the disclosure herein.

Provided herein is a method comprising providing a vehicle driveline of any of configuration described herein or obvious to one of skill in the art upon reading the disclosure herein.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
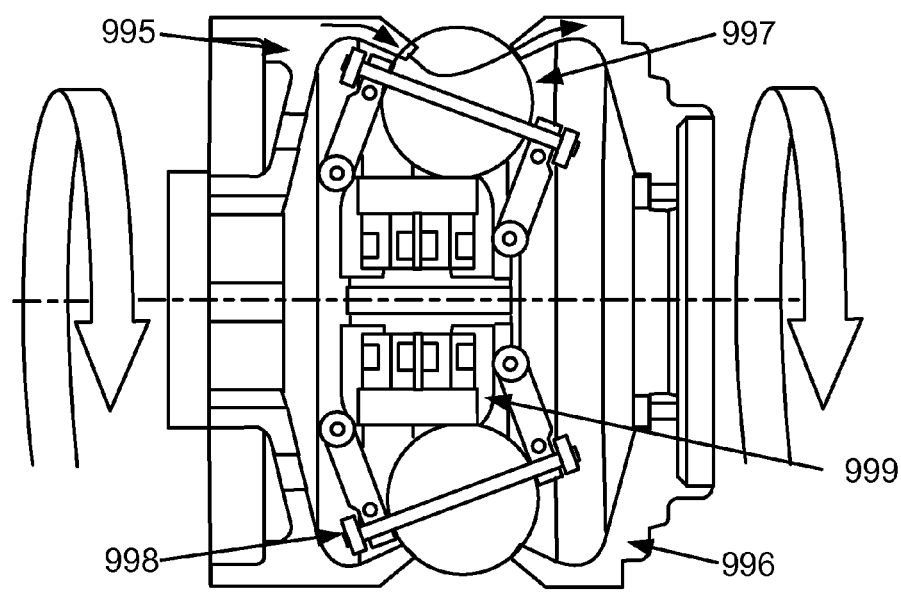
FIG. 1 is a cutaway view of a currently known and used ball type continuously variable transmission (CVT)

Automatic and manual transmissions are commonly used on automobile vehicles. Those transmissions become more and more complicated since the engine speed has to be adjusted to limit the consumption and the emissions of cars. This finer control of the engine speed in usual transmissions can only be done by adding gears and increasing the overall complexity and cost. 6-speed manual transmissions then become frequent as are 8 or 9 speed automatic transmissions.

Besides these transmissions are developed Continuously Variable Transmissions or CVTs. Those CVTs are of many types: belts with variable pulleys, toroidal, conical, at least. The principle of a CVT is that it enables the engine to run at its most efficient rotation speed by changing steplessly the transmission ratio in function of the speed of the car. If needed for example when accelerating, the CVT can also shift to a ratio providing more power. A CVT can change the ratio from the minimum to the maximum ratio without any interruption of the power transmission, at the opposite of usual transmissions which require an interruption of the power transmission by disengaging to shift of ratio.

As described herein, in a vehicle, a variable transmission is replaced by a conventional transmission and a clutch in a vehicle driveline. As a non-limiting example, the variable transmission that employ a ball type Continuously Variable Transmission (CVT, which is also known as CVP for continuously variable planetary, herein) and may replace a conventional transmission in a vehicle, such as a front wheel drive automobile.

Basic concepts of a ball type Continuously Variable Transmissions are described in U.S.20040616399 and AU2011224083A1, incorporated herein by reference in their entirety. Additional variable transmission details are described in U.S. application Ser. No. 13/743,951 filed Jan. 17, 2013, and/or PCT/US2013/026037 filed Feb. 14, 2013, incorporated herein by reference in their entirety. Such a CVT, adapted herein as described throughout this specification, comprises of a certain number of balls 997 (for example, 3-15 balls), depending on the application, two discs 995, 996 with a conical surface contact with the balls 997, as input and output, and an idler 999 as shown on FIG. 1. The balls are mounted on axes 998, themselves hold in a cage or carrier allowing changing the ratio by tilting the ball's axes. An idler 999 sits below the balls in the cage. Other types of ball CVTs also exist, such as the one produced by Milner but are slightly different.

Figure 2:
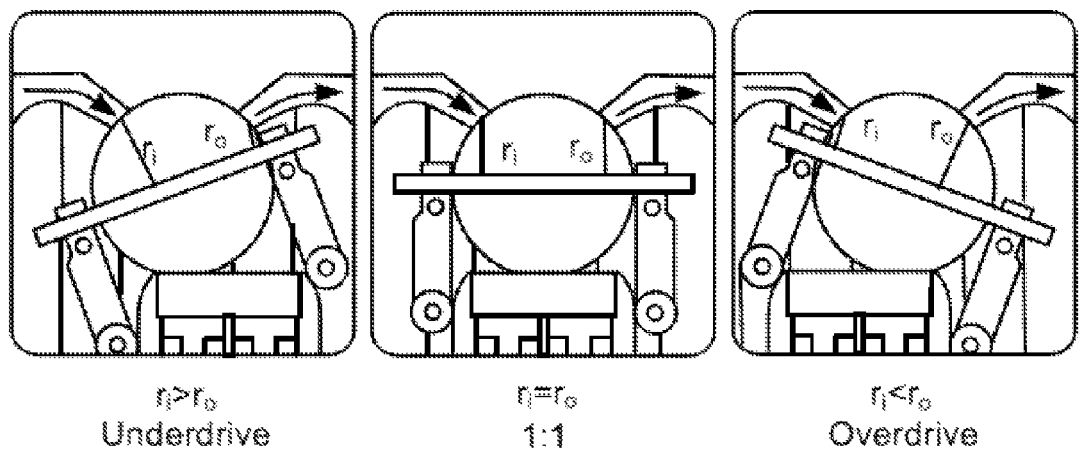
FIG. 2 is a magnified cutaway view of a ball and ring of the CVT of FIG. 1.

The working principle of such a CVT of FIG. 1 is shown on FIG. 2. The CVP itself works with a fraction fluid. The lubricant between the ball and the conical rings acts as a solid at high pressure, transferring the power from the input ring, through the balls, to the output ring. By tilting the ball's axis using the ball axle shaft 54 (shown in additional detail in FIG. 6), the ratio can be changed between input and output of the variator. When the axis is horizontal the ratio is one, when the axis is tilted the distance between the axis and the contact point change, modifying the overall ratio. When the axis is horizontal the ratio is one (1:1), when the axis is tilted the distance between the axis and the contact point change, modifying the overall ratio (input radius>output radius=underdrive; input radius<output radius=overdrive). All the balls' axes are tilted at the same time with a mechanism included in the cage.

Figure 3:
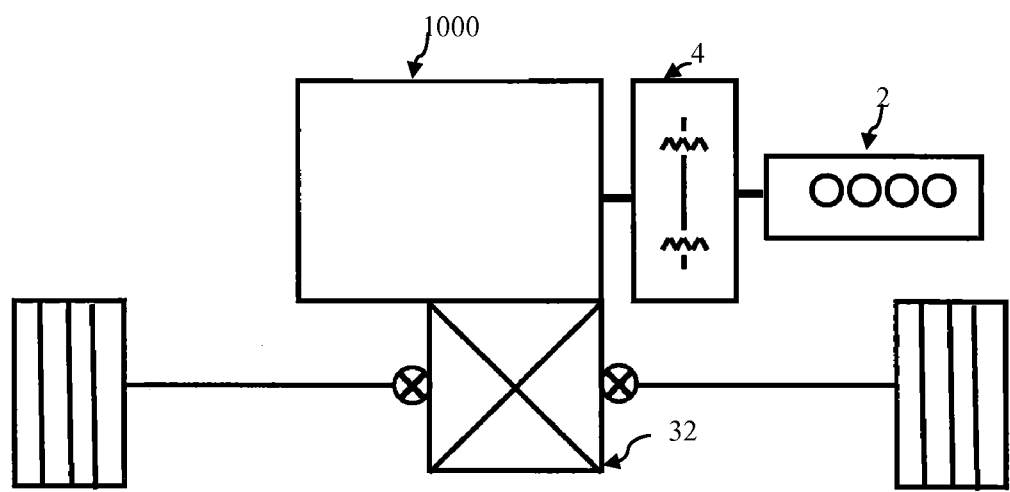
FIG. 3 depicts an embodiment of a typical vehicle driveline including a CVT.

In a car, the CVT 1000 is used to replace traditional transmission and is located between the engine 2 (such as an internal combustion engine or other type of engine) and the differential 32 as shown on FIG. 3. A torsional dampener (alternatively called a damper) 4 may be introduced between the engine and the CVT 1000 to avoid transferring torque peaks and vibrations that could damage the CVT. In some configurations this dampener 4 can be coupled with a clutch for the starting function. In some embodiments, the torsional dampener comprises a torsional spring 6. In some embodiments, the vehicle driveline comprises a clutch for starting the starting function. In some embodiments the dampener is coupled with a clutch for the starting function.

Figure 4:
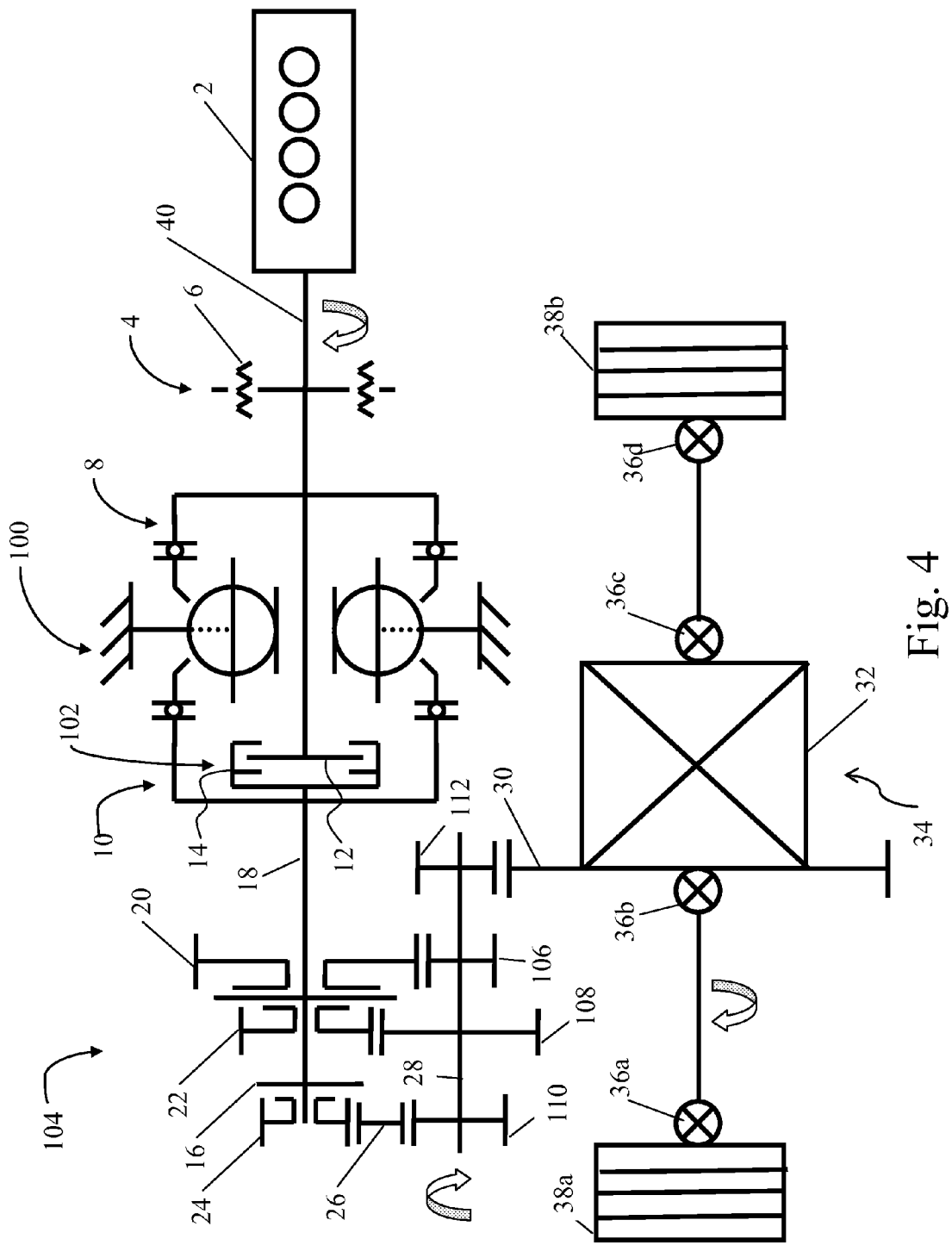
FIG. 4 depicts an embodiment of a variable transmission in a vehicle driveline.
Figure 5:
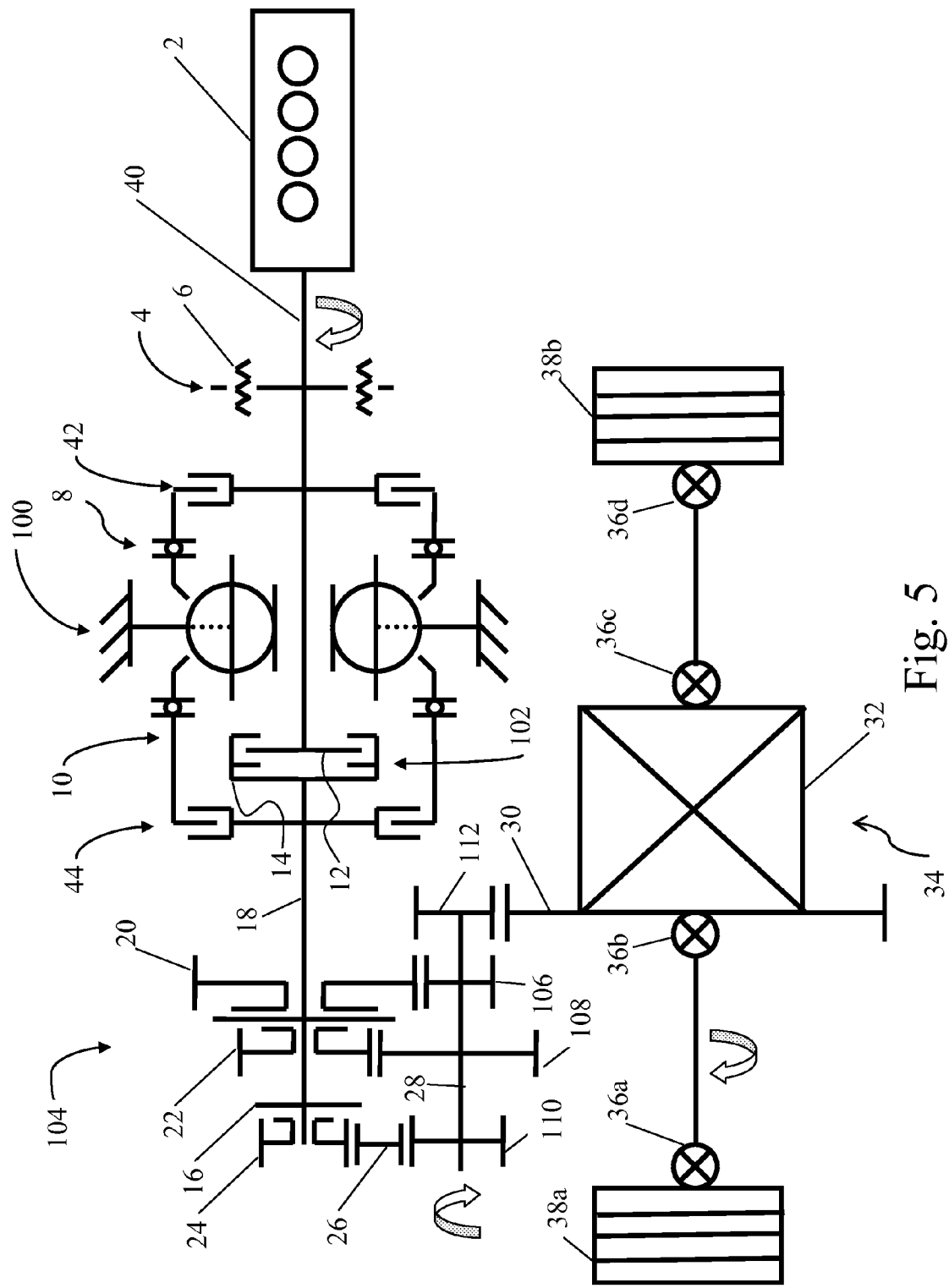
FIG. 5 depicts an embodiment of a variable transmission in a vehicle driveline.

The variable transmission is located between an engine 2 and a vehicle output 34. The vehicle output 34 may include a differential 32 and a drive axle or a differential crown gear (for example, as shown in FIGS. 4 and 5), however, it is understood that other vehicle outputs may be used. The vehicle output may comprise bearings 36a, 36b, 36c, 36d and wheels 38a, 38b of the vehicle. A torsional dampener 4 may also be included, the torsional dampener 4 disposed between the engine 2 and the variable transmission 1000 to reduce vibration and torque peaks. A clutch (not shown) can be added to provide the starting function.

FIG. 4 depicts an embodiment of the transmission composed of a dampener 4 between the ICE 2 and the variable transmission 1000. The variable transmission of FIG. 4 also includes the variator 100, a clutch 102, and a two-speed gearbox 104. The gearbox 104 for may include a reverse mode, in addition to the two-speed functionality. This gearbox 104 may be an automatic gearbox known in the art for automotive or other applications.

Figure 6:
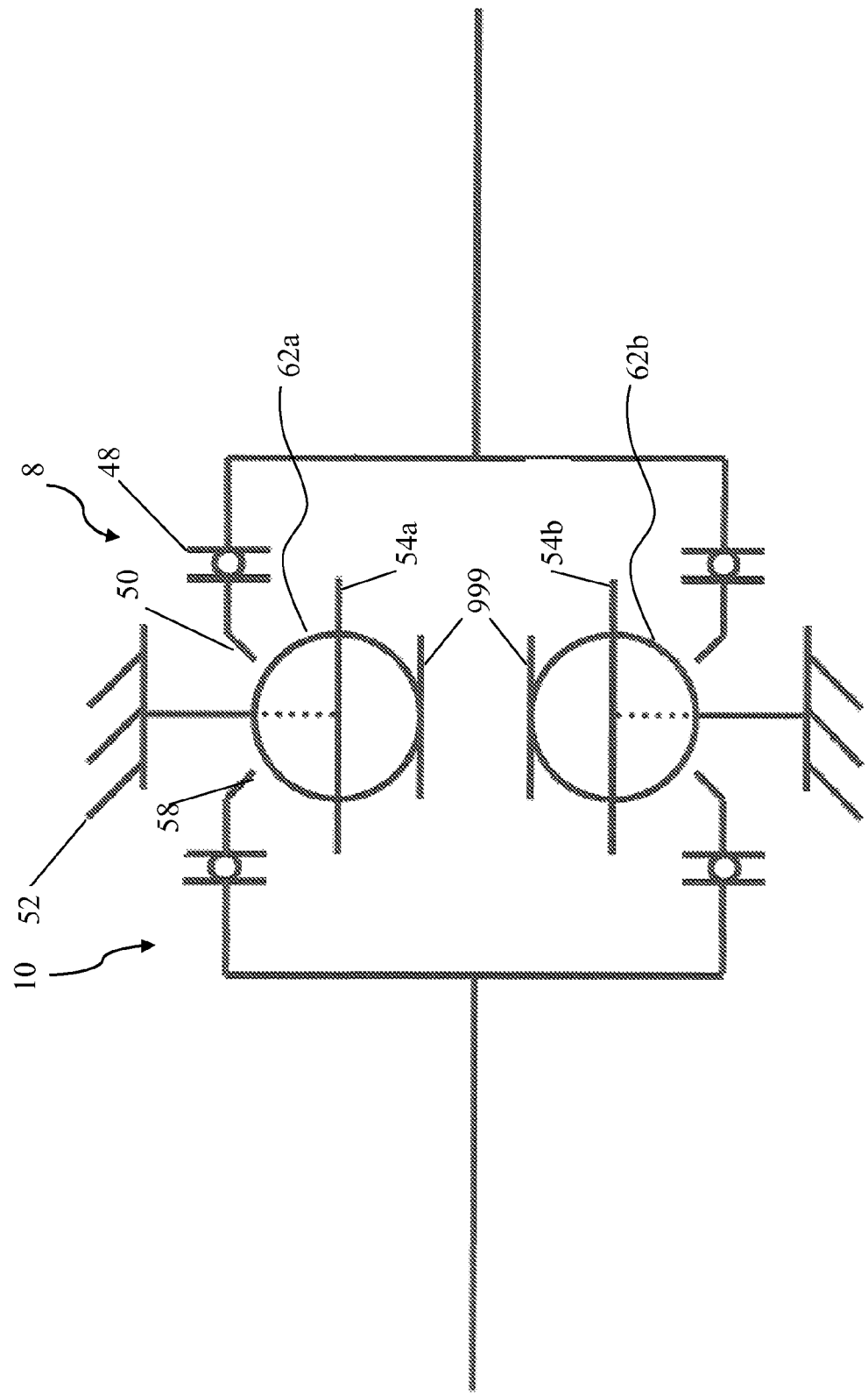
FIG. 6 depicts an embodiment of a ball-type of variator.

The variator 100 of FIG. 4 is also depicted in FIG. 6. FIG. 5 is a variation of FIG. 4, and thus the description of FIG. 6 also applies to FIG. 5, except for the addition of first variator clutch 42 on first assembly 8, and the addition of second variator clutch 44 and second assembly 10 in FIG. 5. Thus, FIG. 6 depicts the variator 100 comprising a first ring assembly 8, a second ring assembly 10, and a carrier assembly disposed therebetween. The carrier assembly includes a plurality of variator balls 62a, 62b having tiltable axle shafts 54a, 54b as described herein. In some embodiments, the first ring assembly 8 is rotatably disposed in a housing; the first ring assembly 8 comprises a first variator ball engagement surface 50 that is in driving engagement with a plurality of variator balls 62a, 62b of the carrier assembly. The first ring assembly 8 may be drivingly engaged with input shaft 40.

As shown in FIG. 6, first variator ball engagement surface 50 is formed in a distal end of the first ring assembly 8. In some embodiments, the first variator ball engagement surface 50 is a conical surface or a concave or convex toroidal surface in contact with or slightly spaced apart from each of the variator balls 62a, 62b. In some embodiments, the first variator ball engagement surface 50 is in driving engagement with each of the variator balls 62a, 62b of the carrier assembly through one of a boundary layer type friction and an elastohydrodynamic film.

The carrier assembly of FIG. 6 is rotatably disposed in the housing and is drivingly engaged with the first ring assembly. The carrier assembly comprises an annular arrangement of the plurality of tiltable variator balls 62a, 62b each having tiltable ball axle shafts 54a, 54b. A cage of the carrier assembly may be configured to be prevented from rotating relative to the housing by a grounding device linked to said ground 52. In some embodiments, each of the ball axle shafts 54a, 54b is adjusted using a cam style tilting mechanism. In some embodiments, each of the ball axle shafts 54a, 54b is adjusted using a split carrier axle skewing mechanism (not shown).

As depicted in FIG. 6, at least, the second ring assembly 10 is rotatably disposed in the housing. The second ring assembly 10 comprises and a second variator ball engagement surface 58 that is in driving engagement with variator balls 62a, 62b of the carrier assembly. In some embodiments, the second variator ball engagement surface 58 is formed in a distal end of the second ring assembly. In some embodiments, the second variator ball engagement surface 58 is a conical surface or a concave or convex toroidal surface in contact with or slightly spaced apart from each of the variator balls 62a, 62b. In some embodiments, the second variator ball engagement surface 58 is in driving engagement with each of the variator balls 62a, 62b of the carrier assembly through one of a boundary layer type friction and an elastohydrodynamic film.

Provided herein are variable transmissions having a direct drive mode, a reverse mode, and a continuously variable mode of operation using a continuously variable variator in combination with a gearbox having a one or two speed forward gear, a reverse gear, and a direct drive clutch that is configured to transfer power from the input shaft directly to the gearbox by running the variator in a speed ratio of one, or by bypassing the variator altogether by using a set of clutches that disconnect the variator from the input shaft.

Thus, provide herein is a vehicle transmission comprising an input shaft having a first direct drive shaft first member formed thereon; an output shaft; a variator comprising a first ring assembly drivingly engaged with the input shaft, a second ring assembly drivingly engages with the output shaft, and a carrier assembly, a direct drive clutch comprising the first direct drive clutch member and a second direct drive clutch member formed on the output shaft drivingly engaged with the second ring assembly; and a gearbox drivingly engaged with the second ring assembly and with the second direct drive clutch member through the output shaft, the gearbox comprising a first gear and a reverse gear; and wherein the vehicle transmission comprises a reverse mode, a direct drive mode, and a continuously variable mode.

In some embodiments, the gearbox comprises a second gear.

In some embodiments, the gearbox is drivingly linked to a differential of a vehicle output. In some embodiments, the gearbox is drivingly linked to a differential of a vehicle output using a countershaft. In some embodiments, the countershaft comprises first countershaft gear, a reverse countershaft gear, and a pinion gear, and wherein the pinion gear is drivingly engaged with a vehicle output through the crown wheel of the differential. In some embodiments, the first countershaft gear is selectively drivingly engaged with the first gear of the gearbox.

In some embodiments, the reverse countershaft gear is selectively drivingly engaged with the reverse gear of the gearbox. In some embodiments, the reverse gear comprises a reverse gear idler between the reverse gear and the reverse countershaft gear. In some embodiments, a reverse mode is enabled when a reverse clutch is engaged with the output shaft and the first gear is disengaged from the output shaft. In some embodiments, a reverse mode is enabled when a reverse clutch is engaged with the output shaft and the first gear is disengaged from the first countershaft gear.

In some embodiments, the gearbox comprises a second gear, and the countershaft comprises a second countershaft gear. The second countershaft gear is selectively drivingly engaged with the second gear of the gearbox. In some embodiments, a reverse mode is enabled when a reverse clutch is engaged with the output shaft, the first gear is disengaged from the output shaft, and the second gear is disengaged from the output shaft. In some embodiments, a reverse mode is enabled when a reverse clutch is engaged with the output shaft, the first gear is disengaged from the first countershaft gear, and the second gear is disengaged from the second countershaft gear.

In some embodiments, disengaging the direct drive clutch results in continuously variable mode operation of the vehicle transmission. In some embodiments, in continuously variable mode power is transferred through the first ring assembly, one or more balls of the carrier assembly, the second ring assembly, the gearbox and to the vehicle output. In some embodiments, the gearbox increases the overall ratio spread and provides a reverse mode using the reverse gear.

In some embodiments, wherein engaging the direct drive clutch results in direct drive mode. In some embodiments, in direct drive mode power is transferred through directly from the input shaft to the gearbox. In some embodiments, in direct drive mode the variator is free to turn. In some embodiments, in direct drive mode a speed ratio of the variator is set to 1 by keeping the ball axles horizontal.

In some embodiments, the vehicle transmission further comprises a first variator clutch on the first ring assembly and a second variator clutch on the second ring assembly. In some embodiments, disengaging the first variator clutch and the second variator clutch disconnect the first ring assembly and the second ring assembly respectively from the input shaft and the output shaft. In some embodiments, a continuously variable mode exists when the first variator clutch and second variator clutch are engaged and the direct drive clutch is disengaged. In some embodiments, a direct drive mode exists when the first variator clutch and second variator clutch are disengaged and the direct drive clutch is engaged. In some embodiments, a direct drive mode exists when the variator stands still.

Provided herein is a vehicle driveline comprising an engine, a variable transmission of any of configuration described herein or obvious to one of skill in the art upon reading the disclosure herein, and a vehicle output. In some embodiments, the vehicle output comprises a wheel differential and one or more wheels of a vehicle. In some embodiments, the vehicle output comprises a wheel differential and a drive axle. In some embodiments, the dampener is disposed between the engine and the variable transmission. In some embodiments, the dampener comprises at least one torsional spring. In some embodiments, the vehicle driveline comprises a clutch for starting the starting function. In some embodiments the dampener is coupled with a clutch for the starting function.

Provided herein is a method comprising providing a variable transmission of any of configuration described herein or obvious to one of skill in the art upon reading the disclosure herein.

Provided herein is a method comprising providing a vehicle driveline of any of configuration described herein or obvious to one of skill in the art upon reading the disclosure herein.

In FIG. 4, the engine 2 is connected to the first ring assembly 8 of the variator 100 through the dampener 4 and the input shaft 40. The input shaft 40 also links to the direct drive clutch 102 comprising a first direct drive clutch member 12 and a second direct drive clutch member 14. The first direct drive clutch member 12 may be formed at an end of the input shaft 40. A second ring assembly 10 of the variator 100 is drivingly engaged with the second direct drive clutch member 14 of the direct drive clutch 102 and is drivingly engaged with to the gearbox 104. The gearbox 104 is drivingly linked to the differential 32 and the vehicle output 34 of the vehicle using a countershaft 28. The countershaft 28 has fixed upon it a first countershaft gear 106, second countershaft gear 108, a reverse countershaft gear 110, and a pinion gear 112. It is anticipated that the first countershaft gear 106, second countershaft gear 108, a reverse countershaft gear 110, and a pinion gear 112 are of varying diameters, as shown in FIG. 4, or 5, for example, or may be in any combination of diameters, that are the same or different, depending on the needs of the CVP.

The first countershaft gear 106 is drivingly engaged with a first gear 20. The second countershaft gear 108 is drivingly engaged with a second gear 22. The reverse countershaft gear 110 is drivingly engaged with a reverse gear 24 through a reverse gear idler 26. A reverse mode may be enabled when a reverse clutch 16 is engaged with the output shaft 18 and the first gear 20 and the second gear 22 are disengaged from the output shaft 18. Alternatively, a reverse mode may enabled when a reverse clutch 16 is engaged with the output shaft 18 and the first gear 20 is disengaged from the first countershaft gear 106, and the second gear 22 is disengaged from the second countershaft gear 108. The crown ring 112 is drivingly engaged with the differential 32 through a differential crown wheel 30.

The central part of the variable transmission in the embodiment of FIG. 4 includes a variator 100. A ball ramp on each side of the variator provides the clamping force necessary to transfer the torque. Ball ramps 48, indicated in FIGS. 4, 5, and 6 by a circle between a pair of vertical lines, making up a first thrust ring on the first ring assembly and a second thrust ring on the second ring assembly are disposed between components of the variable transmission as shown to generate an amount of axial force necessary for proper operation of the variable transmission (i.e. transfer of torque); however, it is understood that the amount of axial force necessary for proper operation may be generated by a clamping mechanism (not shown) or as a load applied during assembling of the variable transmission. Thus, as depicted in FIG. 4, a ball ramp on each side of the variator 100 provides the clamping force necessary to transfer the torque in this embodiment.

This configuration can be used in two different modes: continuously variable mode and direct drive (DD). In continuously variable mode, the direct drive clutch 102 is not engaged and the power is transferred through the first ring assembly 8, the variator 100, the second ring assembly 10, the gearbox 104 and finally goes to the vehicle output 34. The gearbox 104 is added to increase the overall ratio spread and to provide a reverse mode using the reverse gear of 24 and reverse gear idler 26 drivingly engaged with reverse countershaft gear 110 on countershaft 28. As previously noted, countershaft 28 is drivingly engaged with differential crown wheel 30 which drives the vehicle output 34.

The direct drive mode is applied by engaging the direct drive clutch 102. By doing this, the power will directly go the gearbox 104. In this mode, the variator 100 is free to turn, and its speed ratio must be set to 1 (wherein the first ring assembly 8 and the second ring assembly 10 turn together) by keeping the ball axles horizontal.

To avoid having power losses in the transmission when in the direct drive mode, two clutches (labeled as first variator clutch 42 and second variator clutch 44 in FIG. 5) may be added to disconnect the first ring assembly 8 and the second ring assembly 10 from the input shaft 40 and output shaft 18. FIG. 5 shows this variant of the concept.

In the embodiment of FIG. 5, a continuously variable mode exists when the first variator clutch 42 and second variator clutch 44 are engaged and the direct drive clutch 102 is disengaged. In direct drive mode, using the embodiment of FIG. 5, the first variator clutch 42 and second variator clutch 44 are disengaged, thus, the variator 100 stands still and avoids losses due to the friction in the variator 100.

Embodiments of the variable transmission described herein or that would be obvious to one of skill in the art upon reading the disclosure herein are contemplated for use in a variety of vehicle drivelines. For non-limiting example, the variable transmissions disclosed herein may be used in bicycles, mopeds, scooters, motorcycles, automobiles, electric automobiles, trucks, sport utility vehicles (SUV's), lawn mowers, tractors, harvesters, agricultural machinery, all terrain vehicles (ATV's), jet ski's, personal watercraft vehicles, airplanes, trains, helicopters, buses, forklifts, golf carts, motorships, steam powered ships, submarines, space craft, or other vehicles that employ a transmission.

While the figures and description herein are directed to ball-type variators (CVTs), alternate embodiments are contemplated another version of a variator (CVT), such as a Variable-diameter pulley (VDP) or Reeves drive, a toroidal or roller-based CVT (Extroid CVT), a Magnetic CVT or mCVT, Ratcheting CVT, Hydrostatic CVTs, Naudic Incremental CVT (iCVT), Cone CVTs, Radial roller CVT, Planetary CVT, or any other version CVT.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A vehicle transmission comprising:
   an input shaft having a first direct drive shaft first member formed thereon;
   an output shaft;
   a variator comprising a first ring assembly drivingly engaged with the input shaft, a second ring assembly drivingly engaged with the output shaft, and a carrier assembly, wherein the carrier assembly comprises an annular arrangement of a plurality of tiltable variator balls each having a tiltable ball axle shaft;
   a direct drive clutch comprising a first direct drive clutch member and a second direct drive clutch member formed on the output shaft drivingly engaged with the second ring assembly; and
   a gearbox drivingly engaged with the second ring assembly and with the second direct drive clutch member through the output shaft, the gearbox comprising a first gear and a reverse gear;
   wherein the vehicle transmission comprises a reverse mode, a direct drive mode, and a continuously variable mode.

2. The vehicle transmission of claim 1, wherein the gearbox comprises a second gear.

3. The vehicle transmission of claim 1, wherein the gearbox is drivingly linked to a differential of a vehicle output.

4. The vehicle transmission of claim 1, wherein the gearbox is drivingly linked to a differential of a vehicle output using a countershaft.

5. The vehicle transmission of claim 4, wherein the countershaft comprises a first countershaft gear, a reverse countershaft gear, and a pinion gear, and wherein a crown ring is drivingly engaged with a vehicle output.

6. The vehicle transmission of claim 5 wherein the first countershaft gear is selectively drivingly engaged with the first gear of the gearbox.

7. The vehicle transmission of claim 5 wherein the reverse countershaft gear is selectively drivingly engaged with the reverse gear of the gearbox.

8. The vehicle transmission of claim 5 wherein the reverse gear comprises a reverse gear idler between the reverse gear and the reverse countershaft gear.

9. The vehicle transmission of claim 5, wherein a reverse mode is enabled when a reverse clutch is engaged with the output shaft and the first gear is disengaged from the output shaft.

10. The vehicle transmission of claim 5, wherein a reverse mode is enabled when a reverse clutch is engaged with the output shaft and the first gear is disengaged from the first countershaft gear.

11. The vehicle transmission of claim 5, wherein the gearbox comprises a second gear, and the countershaft comprises a second countershaft gear.

12. The vehicle transmission of claim 11, wherein the second countershaft gear is selectively drivingly engaged with the second gear of the gearbox.

13. The vehicle transmission of claim 11, wherein a reverse mode is enabled when a reverse clutch is engaged with the output shaft, the first gear is disengaged from the output shaft, and the second gear is disengaged from the output shaft.

14. The vehicle transmission of claim 11, wherein a reverse mode is enabled when a reverse clutch is engaged with the output shaft, the first gear is disengaged from the first countershaft gear, and the second gear is disengaged from the second countershaft gear.

15. The vehicle transmission of claim 1, wherein disengaging the direct drive clutch results in continuously variable mode operation of the vehicle transmission.

16. The vehicle transmission of claim 15, wherein in continuously variable mode power is transferred through the first ring assembly, one or more balls of the carrier assembly, the second ring assembly, the gearbox and to the vehicle output.

17. The vehicle transmission of claim 15, wherein in direct drive mode power is transferred through directly from the input shaft to the gearbox.

18. The vehicle transmission of claim 15, wherein in direct drive mode the variator is free to turn.

19. The vehicle transmission of claim 1, wherein the gearbox increases the overall ratio spread and provides a reverse mode using the reverse gear.

20. The vehicle transmission of claim 1, wherein engaging the direct drive clutch results in direct drive mode.

* * * * *

UNITED STATES PATENT AND TRADEMARK OFFICE
CERTIFICATE OF CORRECTION

PATENT NO. : 9,638,296 B2  
APPLICATION NO. : 14/425601  
DATED : May 2, 2017  
INVENTOR(S) : Mark R. J. Versteyhe et al.

Page 1 of 1

It is certified that error appears in the above-identified patent and that said Letters Patent is hereby corrected as shown below:

At Column 1, Line 35 "first member" should be replaced with "member".

At Column 6, Line 4 "shaft first" should be replaced with "clutch".

In Claim 1, at Column 9, Lines 21-22 "shaft first" should be replaced with "clutch".

In Claim 1, at Column 9, Line 29 "a first" should be replaced with "the first".

Signed and Sealed this  
Twenty-seventh Day of March, 2018

Andrei Iancu  
*Director of the United States Patent and Trademark Office*